United States Patent
Gorny et al.

(10) Patent No.: US 9,462,215 B2
(45) Date of Patent: Oct. 4, 2016

(54) ENHANCED GLOBAL DIMMING FOR PROJECTOR DISPLAY SYSTEMS

(71) Applicant: Dolby Laboratories Licensing Corporation, San Francisco, CA (US)

(72) Inventors: Douglas J. Gorny, Felton, CA (US); Douglas Jason Darrow, Frisco, TX (US); Craig Todd, Mill Valley, CA (US)

(73) Assignee: Dobly Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/530,977

(22) Filed: Nov. 3, 2014

(65) Prior Publication Data

US 2015/0124176 A1    May 7, 2015

Related U.S. Application Data (60) Provisional application No. 61/899,865, filed on Nov. 4, 2013.

(51) Int. Cl.
| | |
|---|---|
| *H04N 5/74* | (2006.01) |
| *H04N 9/31* | (2006.01) |
| *G03B 21/20* | (2006.01) |
| *G02B 26/08* | (2006.01) |
| *G02B 27/10* | (2006.01) |

(52) U.S. Cl.
CPC ............ *H04N 5/7441* (2013.01); *G03B 21/20* (2013.01); *H04N 9/3138* (2013.01); *H04N 9/3155* (2013.01); *H04N 9/3161* (2013.01); *H04N 9/3164* (2013.01); *G02B 26/0833* (2013.01); *G02B 27/102* (2013.01)

(58) Field of Classification Search
None
See application file for complete search history.

(56) References Cited

U.S. PATENT DOCUMENTS

| | | | |
|---|---|---|---|
| 7,859,554 B2 | 12/2010 | Young | |
| 8,125,702 B2 | 2/2012 | Ward | |
| 8,684,533 B2 | 4/2014 | Whitehead | |
| 2004/0263942 A1* | 12/2004 | Lopez | G02F 1/1347 359/277 |
| 2006/0023173 A1* | 2/2006 | Mooradian | G03B 21/204 353/94 |
| 2009/0174638 A1 | 7/2009 | Brown Elliott | |
| 2009/0225234 A1* | 9/2009 | Ward | G03B 33/08 348/744 |
| 2009/0303397 A1 | 12/2009 | Allen | |
| 2010/0110383 A1 | 5/2010 | Tang | |
| 2012/0038693 A1 | 2/2012 | Kang | |
| 2013/0147777 A1 | 6/2013 | Lau | |

FOREIGN PATENT DOCUMENTS

| | | | |
|---|---|---|---|
| JP | 2012-103642 | | 5/2012 |
| JP | 2012103642 | * | 5/2012 |
| WO | 2007/050399 | | 5/2007 |
| WO | 2012/139634 | | 10/2012 |
| WO | 2014/116715 | | 7/2014 |

* cited by examiner

*Primary Examiner* — Michael Teitelbaum (57) ABSTRACT

Projector display systems comprising a light dimmer and first modulator are disclosed. The light dimmer may comprise an adjustable iris, adjustable light sources and/or LCD stack that is capable of lowering the luminance of the light source illuminated the first modulator. The first modulator may comprise a plurality of analog mirrors (e.g. MEMS array) and the second modulator may comprise a plurality of mirrors (e.g., DMD array). The display system may further comprise a controller that sends control signals to the light dimmer and first modulator. The display system may render a desired dynamic range for rendering a projected image by a combination of such control signals.

8 Claims, 5 Drawing Sheets

ENHANCED GLOBAL DIMMING FOR PROJECTOR DISPLAY SYSTEMS

CROSS REFERENCE TO RELATED APPLICATIONS

This application claim the benefit of priority to U.S. Provisional Application Ser. No. 61/899,865, filed on Nov. 4, 2013, which is incorporated herein by reference in its entirety.

TECHNICAL FIELD

The present invention relates to displays systems and, more particularly, to projector display systems having Enhanced Dynamic Range (EDR) capability.

BACKGROUND

In a conventional projector system, there is typically a single light source that illuminates a screen with an image that is modulated by some optical system within the projector. Increasingly, it is desirable to construct projector systems that have the ability to project images with an Enhanced Dynamic Range (EDR). Such EDR projector displays may typically have a contrast ratio that exceeds typical cinema standards or modern displays including contrast ratios of more than 5,000 to 1 and may be 1,000,000 to 1 and higher in some circumstances. Such displays may also have a color gamut that exceeds current cinema standards.

SUMMARY

Several embodiments of display systems and methods of their manufacture and use are herein disclosed.

Projector display systems comprising a light dimmer and first modulator are disclosed. The light dimmer may comprise an adjustable iris, adjustable light sources and/or LCD stack that is capable of lowering the luminance of the light source illuminated the first modulator. The first modulator may comprise a plurality of analog mirrors (e.g. MEMS array) and the second modulator may comprise a plurality of mirrors (e.g., DMD array). The display system may further comprise a controller that sends control signals to the light dimmer and first modulator. The display system may render a desired dynamic range for rendering a projected image by a combination of such control signals.

In one embodiment, a projector display system, said display system comprising: a light source; a controller; a light dimmer, said light dimmer being illuminated by said light source and said light dimmer being controller by the controller to dim the amount of light from the light source; a first modulator, said first modulator being illuminated by light from said light dimmer and capable of modulating light from said light dimmer under control from the controller. The controller may further comprise: a processor; a memory, said memory associated with said processor and said memory further comprising processor-readable instructions, such that when said processor reads the processor-readable instructions, causes the processor to perform the following instructions: receiving image data, said image data comprising Enhanced Dynamic Range (EDR) image data; sending control signals to said light dimmer such that said light dimmer may allocate a desired proportion of the light from said light source onto said first modulator; and sending control signals to said first modulator such that said desired proportion of the light from said light source is modulated to form the desired screen image.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Global Dimming EDR Projector Embodiment

EDR projector systems and dual modulation projector systems have been described in commonly-owned patents and patent applications, including:

(1) U.S. Pat. No. 8,125,702 to Ward et al., issued on Feb. 28, 2012 and entitled "SERIAL MODULATION DISPLAY HAVING BINARY LIGHT MODULATION STAGE";

(2) United States Patent Application 20130148037 to Whitehead et al., published on Jun. 13, 2013 and entitled "PROJECTION DISPLAYS"

(3) United States Patent Application 20130147777 to Lau et al., published on Jun. 13, 2013 and entitled "APPLICATION OF MEMS PIXELS IN DISPLAY AND IMAGING DEVICES"; and (4) United States Patent Application 20120038693 to Kang et al., published on Feb. 16, 2012 and entitled "HIGH DYNAMIC RANGE PROJECTION SYSTEM".

—which are hereby incorporated by reference in their entirety.

In many of those EDR systems, there may be dual modulator architecture that affects EDR projection. For example, one system may comprise one or more DMDs that may separately modulate light from a light source and produce EDR projection by a locally dimming portions of an input screen image.

As discussed further herein, there are systems, techniques and methods for performing a global dimming that may affect EDR projection of desired screen images.

Figure 1:
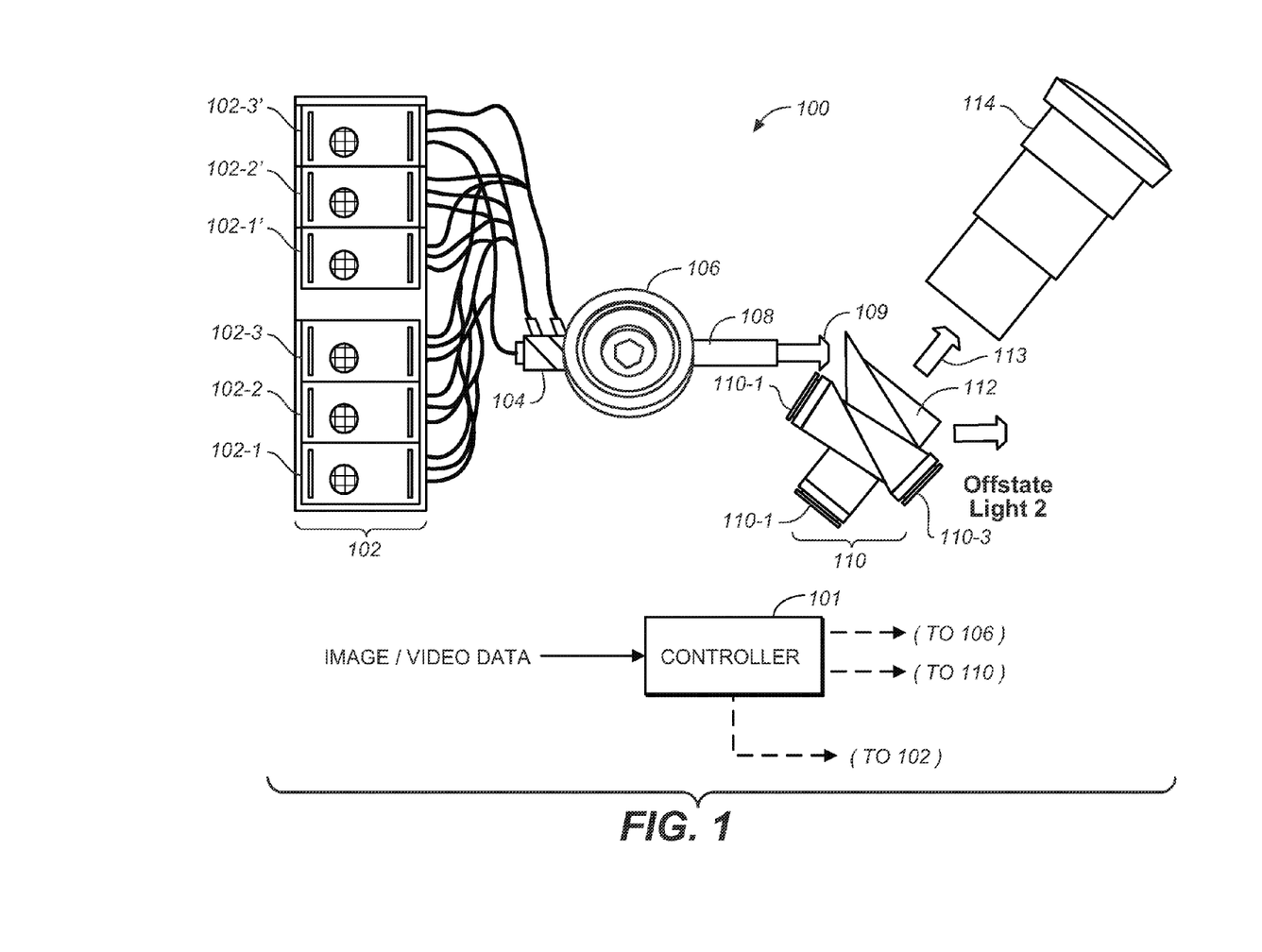
FIG. 1. is one embodiment of a projector display system comprising an iris to affect global dimming that may be suitable for the systems, methods and techniques of the present application disclosed herein.

FIG. 1 is one embodiment of a projector system that may affect EDR projection by employing global dimming with use of an iris. Projector 100 comprises a light source—in this example, a bank of laser light sources 102-1, 102-2, 102-3 and 102-1', 102-2' and 102-3'—which may further comprises two (or more) RGB laser light sources. It should be appreciated that other light sources may be employed that are also known in the art—e.g., a Xenon lamp, an array of lasers (e.g., diodes or otherwise) or other solid-state light emitters, an arc lamp, or the like.

Light from light source 102 may be directed along an optical path (e.g., an integrating rod 104 in the embodiment of FIG. 1) and encounter an iris 106. In some embodiments, the light source may be modulated under control of controller 101. Iris 106 may (under control from controller 101) may expand and/or constrict the amount of light in the path to desirably affect a global dimming of the projector system. Thereafter, the light 109 may continue along an optical path further (e.g., integrating rod 108) to a first modulator. In the embodiment of FIG. 1, first modulator 110 may comprise one (or more) DMD arrays. In this example there are three DMD arrays 110-1, 110-2 and 110-3 (or alternatively, a three chip DLP assembly) respectively, as optical components 112 may split the incoming white light into its spectral components (e.g. red, green and blue respectively). Iris 106 may be one example of a light dimmer for the projector system that dims the light from the light source of the system. Another example of a suitable light dimmer may be an adjustable light source that may adjust luminance levels under control of controller 101.

First modulator 110 may thereafter affect a desired modulation (under control from controller 101) of light—such that, when projected (113) through projector optics 114 may affect a desired projected image on a screen (not shown) to one or more viewers. In one alternative embodiment, the offstate light may also be recycled—providing another control parameter for the iris. In the case of recycling, the light may likely be split into individual spectrums for each of the modulators. However, the modulator requiring the most light may drive the iris requirements.

Alternative Global Dimming EDR Projector Embodiment

Figure 2:
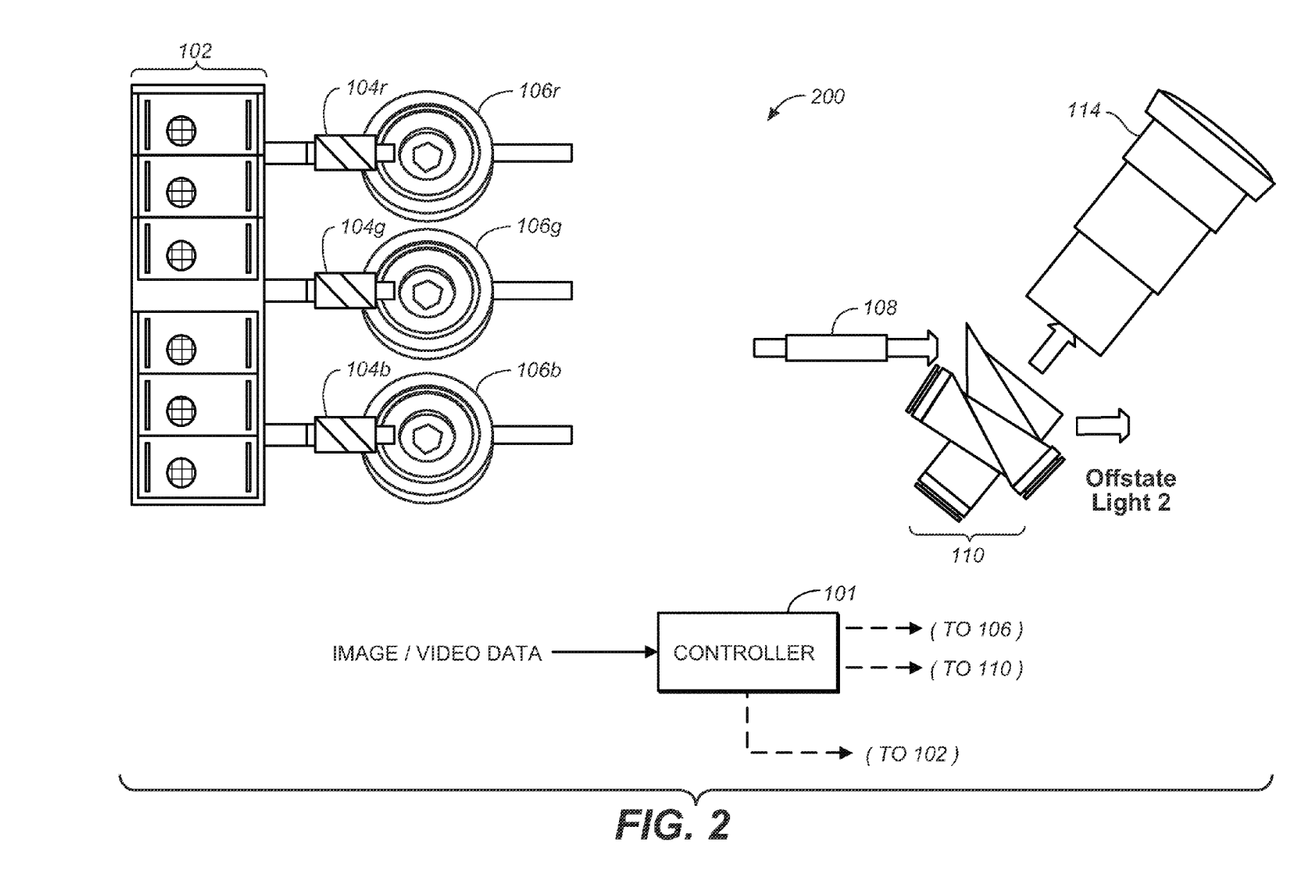
FIG. 2 depicts another embodiment of projector display system comprising an iris for more than one color channel to affect global dimming as made in accordance with the principles of the present application.

As an alternative to performing global dimming on the white light from a light source, it is possible to perform global dimming on the different spectral channels that may be provided by a projector system. FIG. 2 is an alternative embodiment projector system comprising a light source 102 (which may be modulated under control of controller 101). As before, light source 102 may be any source of light possible that may be split into its spectral components. In FIG. 2, light source 102 is a bank of laser light sources (e.g., red, green and blue laser light) in which may be transmitted along light fibers 104r, g and b, respectively. For each (or some) color channel, there may be a set of irises 106r, g and b, respectively. These irises may be under control of controller 101—such that each light channel may experience a global dimming of the light channel respectively.

Thereafter, the light may be combined in light combiner (e.g., an integrating rod 108) and—as before—light may illuminate first modulator 110 that may comprise one (or more) DMD arrays. Here, as before, there are three DMD arrays 110-1, 110-2 and 110-3 (or alternatively, a three chip DLP assembly) respectively, as optical components 112 may split the incoming white light into its spectral components (e.g. red, green and blue respectively). Second modulator 110 may thereafter affect a desired modulation (under control from controller 101) of light—such that, when projected (113) through projector optics 114 may affect a desired projected image on a screen (not shown) to one or more viewers.

Figure 3:
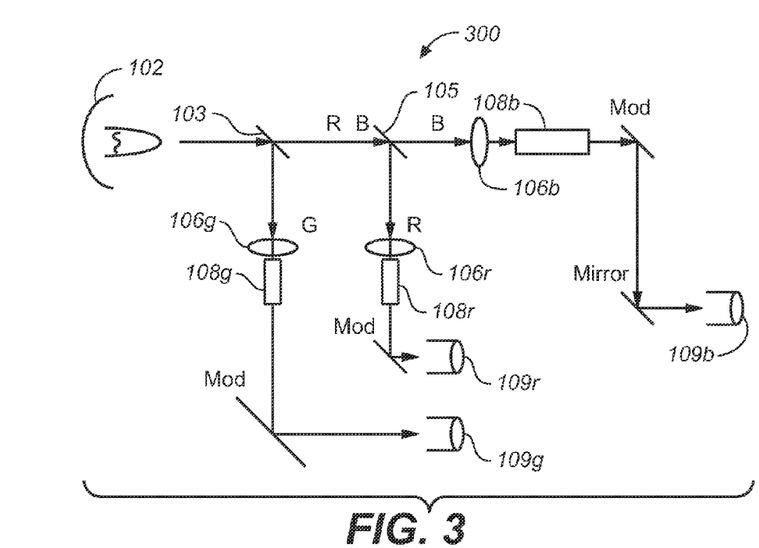
FIG. 3 depict yet another embodiment of a projector display system comprising an iris in more than one color channel which is split from a set of colored light sources.

FIG. 3 is yet another embodiment of a projector system that affects global dimming on separate color channels. Projector system 300 may comprise a white light source 102 (from any known source, e.g., xenon lamp, arc lamp or the like). Dichroic beam splitters 103 and 105 are able to split the green, red and blue light onto their separate optical paths. Irises 106 r, g and b may affect the desired global dimming on these separate color channels. The resulting light may be placed optical paths 108 r, g and b respectively—and thereafter, may be separately modulated (by Mod, for each respectively channel, as is known in the art). Light from these separately modulated may be sent along optical paths 109 r, g and b, respectively—and recombined as desired to form a combined light beam.

Alternative Embodiments for Light Integration and Modulation

Figure 4A:
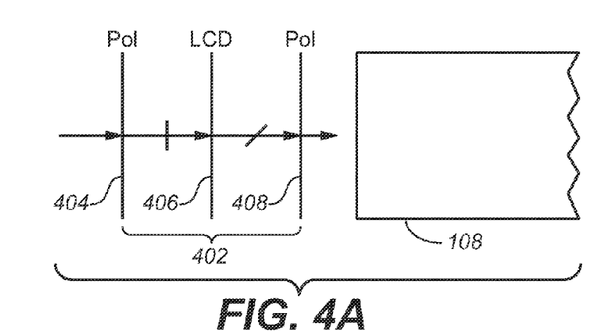
FIGS. 4A and 4B depict other embodiments of a projector display systems comprising an integrating rod and a modulator in the path of the integrating rod where the integrating rod may be either a unitary light pipe or segmented.
Figure 4B:
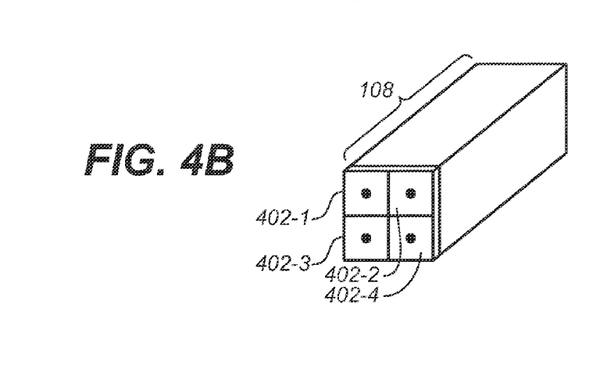

FIGS. 4A and 4B depict another embodiment for modulating and integrating the light from the light source. FIG. 4A depicts that—prior to light entering an integrating rod 108 (or any other suitable light pipe and/or conduit)—there may be placed prior to the rod 108, an LCD stack 402. LCD stack 402 may further comprises a first polarizing layer 404, an LCD 406 and a second polarizing layer 408. LCD stack 402 may be under control by controller 101 and may provide an additional point of modulation of the light, as may be desired.

FIG. 4B depicts one embodiment in which the LCD stack may be partitioned itself (e.g. 402-1, 402-2, 402-3 and 402-4—or any other number of partitions)—so that the light entering into integrated rod 108 may be dimmed according to the individual LCD stacks that are in the optical path. Integrated rod 108 in this instance may itself be so partitioned and/or segmented and the light from that partitioning and/or segmentation may illuminate different areas of the projection screen itself, to affect a regional dimming of the projector system.

Global Dimming Image Processing Embodiments

In one embodiment, methods for determining global (and/or regional) brightness levels for a frame or scene may be affected to achieve a desired projected image to be displayed. These methods may be implemented based on a per-frame and/or a per-scene basis. These methods may employ histogram and/or metadata in order to affect this processing. For merely one aspect, these methods may provide a smooth transition between brightness levels in a frame. In some embodiments, variations in the gradient of the brightness level changes may be implemented for scene changes, different types of scene changes, and/or different types of brightness level changes that may occur within a scene. In another embodiment, these methods may include R, G, B independent illumination adjustments with or without having entire scene knowledge. Methods not having entire scene knowledge may employ techniques such as, e.g., analyzing the current frame or nearby frames (either before/after).

The brightness levels may be registered to regions via, for example, a segmented light pipe, and the brightness levels may then be analyzed—e.g., based on similar factors and also with respect to other segments in the same or temporally related frames. In addition, a histogram may be calculated or provided via metadata encoded in the image data (and/or provided from a separate source) of frame data or regionally based frame data Other alternative embodiments may employ intelligent guessing (e.g., AI, heuristics) to determine scene changes or special regionally based cases where viewers may be more tolerant to abrupt brightness changes. In another embodiment, metadata based on off-line processing or post-production tweaking or intervention may be included in meta-data encoded or provided separately. Further information may be provided for transitions from high dynamic range (HDR) to low dynamic range (LDR) for backward compatibility with legacy systems or to provide special new features such as enhanced higher dynamic range, enhanced 3D, etc.

In one embodiment, metadata may be provided in a separate file along with keys for unlocking frame content or various features to show the movie with enhancements provided by special processing of the content and/or as directed by the metadata. In an extension, the brightness parameters may be provided to adjust all the primaries at once or in pairs or any other grouping combination when using source adjustment.

For the various embodiments described herein with an iris, these methods may be utilized by adjusting the primaries—e.g., the iris can be adjusted instead of the sources. While potentially less efficient, it allows for the panel contrast to be applied over a larger brightness range (e.g., increasing sequential contrast) and may improve simultaneous on screen contrast by reducing the aperture size in the projection lens (e.g., corner box and ANSI contrast).

R, G, B Independent Illumination Adjustment without Entire Scene Knowledge

For merely two embodiments of methods to employ on a RGB (or other spectral separation scheme) that may not have entire scene knowledge, the display system may affect one or both methods during the course of processing as follows:

(1) Analyze the current image frame to determine color gamut volume; in particular the maximum contribution required each individual primary channel (e.g., individually controllable illumination source of fixed wavelength range). Use these maximum requirements to set the levels of each individual primary.

(2) Analyze the current image frame and frames before and/or after to determine the maximum requirements over time and provide a more smooth transition of illumination adjustments over time.

It may be possible to use either method above if there are individually controllable illumination sources for each primary and each of those sources can be registered to a portion of the modulation device (e.g., using a method like a segmented integrating rod). A maximum requirement calculation may be done on a regional basis associated with each individually controllable source. This may tend to provide enhanced simultaneous contrast if used properly in conjunction with other dual modulation compensation algorithms to remove errors associated with segment boundaries.

These adjustments may tend to reduce power consumption and prolong lifetime. In addition, these adjustments may allow the panel contrast to be applied over a larger brightness range (e.g., improved sequential contrast).

Primary Independent Illumination Adjustment with Entire Scene Knowledge:

In those embodiments in which the system has entire (or substantially all) scene knowledge, then one suitable method may employ histogram data and desired mapping parameters to the illumination adjustment algorithm—possibly by means of metadata.

In another embodiment, it may be possible to delay playback enough frames to calculate a smooth transition of the illumination sources over time. However, even if this was implemented, it may do so without knowledge of the scene cut locations and may need to rely on intelligent guessing to know when more abrupt changes would be tolerated. By providing histograms for each scene, a suitable method may allow for illumination sources to have adjustment profiles which may implement abrupt changes in addition to removing the need to delay and analyze the content.

Histograms—even with scene knowledge which may be automatically generated—tend to lack the ability to provide the ideal mapping preferences when transforming high dynamic range content to lower dynamic range displays. EDR metadata may be generated with the knowledge of these preferences directly from creative interaction. As such, using metadata with desired mapping parameters may further enhance the illumination level adjustments to produce a final sequence of images which substantially represent the creative intent independent of the display's overall performance.

In yet another embodiment, it may be possible to adjust all the primaries at once or in pairs or any other grouping combination when using source adjustment. In addition, all the illumination exiting the projection lens may be adjusted using an adjustable iris under algorithm control, as described herein. In some embodiments, it may be possible to adjust the source, adjust the irises, or some combination of both.

These methods involving illumination adjustment may allow for the panel contrast to be applied over a larger brightness range (e.g., increasing sequential contrast) and may improve simultaneous-on-screen contrast by reducing the aperture size in the projection lens (e.g., corner box and ANSI contrast).

Dynamic Range Mapping Embodiments

Figure 5:
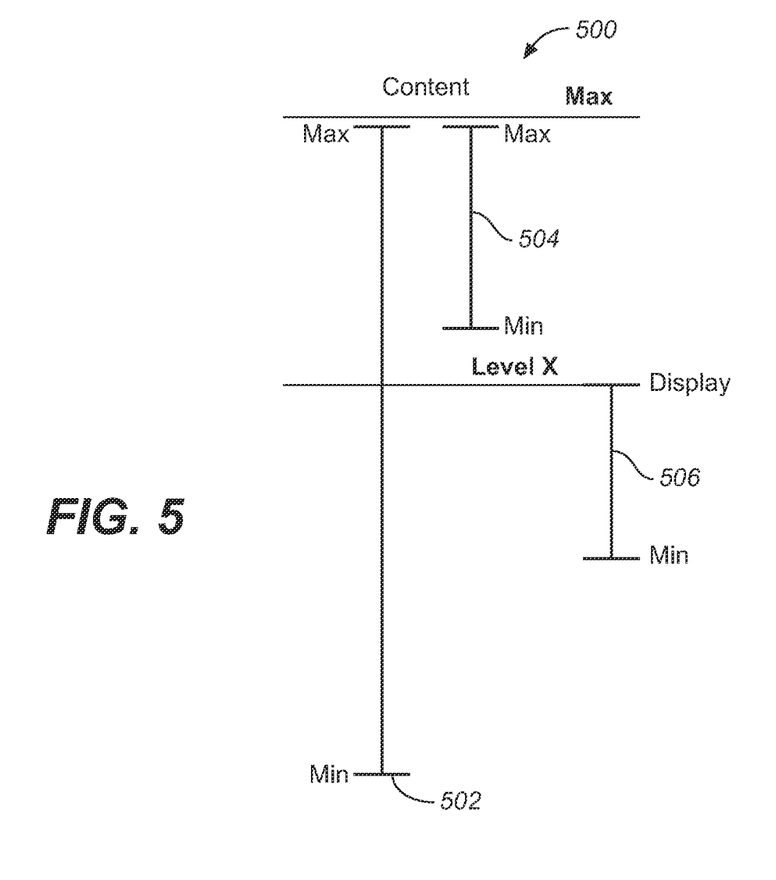
FIG. 5 depicts one exemplary dynamic range mapping that may be affected by a projector system as made in accordance with the principles of the present application.
Figure 6:
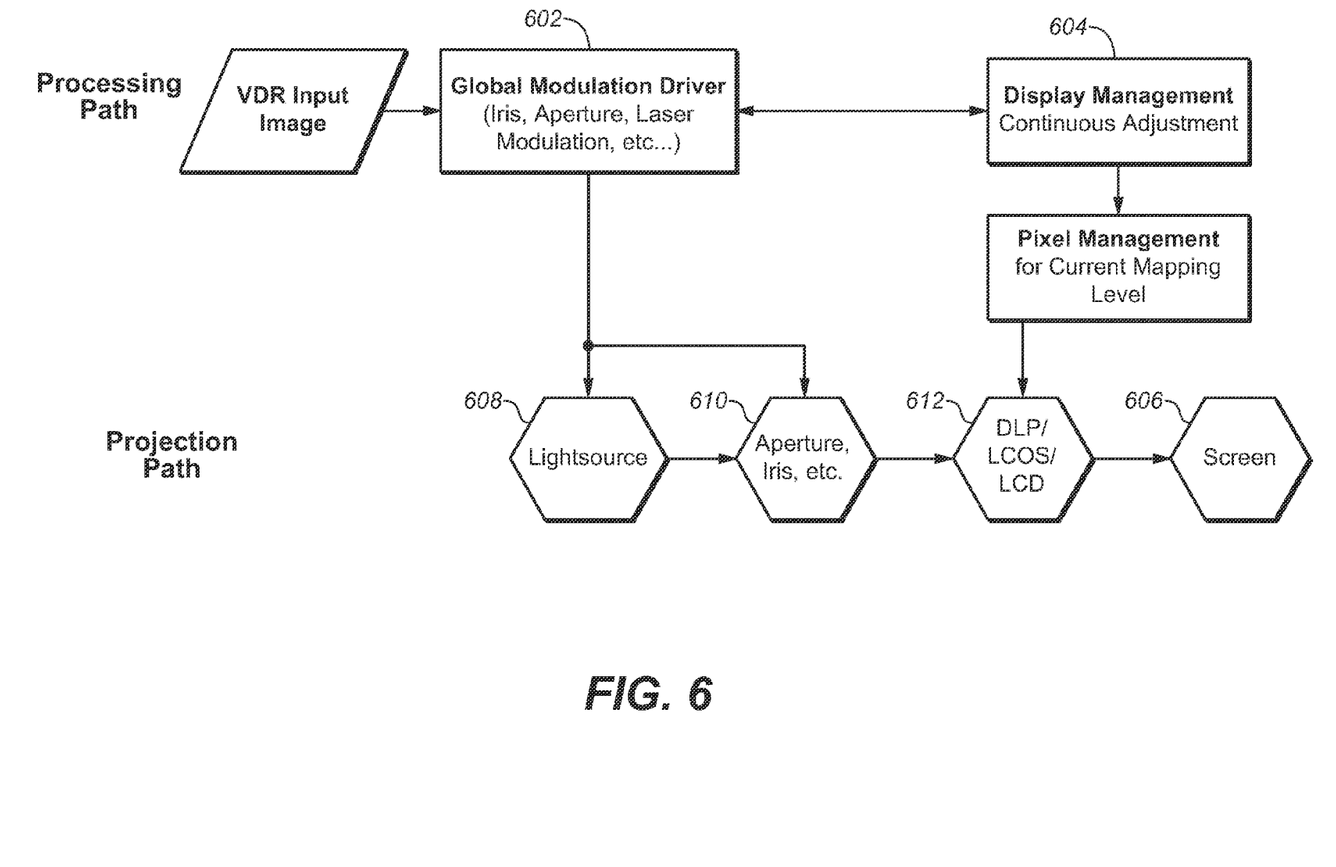
FIG. 6 depicts one high-level diagram of image processing system that may affect processing by a projector system as made in accordance with the principles of the present application.

FIGS. 5 and 6 depict one example and embodiment of image processing where the dynamic range mapping may occur in a system that may comprise adjustable irises and/or adjustable light (e.g. laser and/or LED) systems. These systems may employ the current frame (or a few frames before or after) to determine the iris or LED settings. In some such systems, it may not be possible to have knowledge of the entire scene—and thus adjustments may be made which adversely affect the viewer experience. To improve viewer experience, it may be possible to employ algorithms using the knowledge gain developing display management.

FIG. 5 depicts a dynamic range mapping 500 that illustrates several embodiments. The potential full dynamic range (Min to Max) of the input image content (501) may be particularly large. If the dynamic range of the current content to be rendered is shown at 504, then the content is asking for very bright content to be rendered. However, the dark values in the content will be rendered relatively brightly as well. The display system may be able to adjust the luminance level to range 506 (e.g., via the dimming techniques (irises and/or adjustable light source, described herein) to achieve darker values with a maximum value that may be suitable for rendering.

FIG. 6 is one embodiment of a method that may be suitable to affect the image processing for projector systems described herein. In particular, FIG. 6 illustrates example processing and light modulation paths in a present display system with global light modulation capability. In some embodiments, the processing path includes a global modulation driver (602) and a display management module (604) that are respectively configured to control light generation components, light modulation components (612), light control components (610), etc., in the projection path for the purpose of rendering LDR images on a display screen (606). The light modulation components (612) may be, but are not limited to, Digital Light Processing (DLP)/Liquid Crystal on Silicon (LCoS)/Liquid Crystal Display (LCD) based light modulation components. The light control components (610) may be but are not limited to a global aperture, a global iris, etc., and are controlled in part by a setting of global light modulation. The LDR images are derived to a large extent by perceptually accurately adjusting input code values in VDR input images which may be received in a video signal input of a wide dynamic range.

In the processing path, a VDR input image in the video signal input is analyzed by the global modulation driver (602) to determine a luminance level distribution (e.g., histogram, tables, etc.) of the VDR input image, and to determine an optimal dynamic range window (which is an instance of the LDR under a specific setting of global light modulation) to which input code values in the VDR input image are mapped. The determination of the optimal dynamic range window includes a determination of absolute minimum and maximum luminance levels to be generated by a global light source module (608) and/or by global light modulating components such as a global aperture, a global iris, etc. The global modulation driver (602) can be configured to perform light source control operations as well as perform control operations of the global light modulation components (612), and to modulate global amount of light to illuminate one or more local modulation layers for the purpose of rendering an LDR image—which corresponds to the VDR input image—on the display screen (606). In some embodiments, the global modulation driver (602) can also be configured to perform laser modulation control as a part of global or local light modulation. In one embodiment, the global modulation driver may modulate the global amount of light sent to screen through light modulation or aperture.

The display management module (604) of FIG. 6 can be configured to continuously update its input parameters such as the minimum and maximum luminance levels of optimal dynamic range windows. In some embodiments, the minimum and maximum luminance levels of the optimal dynamic range windows vary as functions of settings of global light modulation from image to image. Specific settings of global light modulation depend on image data of specific VDR input images and are used to place the light source module (608) and light modulation components (612) in specific states to produce specific minimum and maximum luminance levels and optimal dynamic ranges.

The display management module (604) of FIG. 6 can be configured to perform continuous adjustment between the input code values in VDR input images and output code values in corresponding LDR images. The display management module (604) can be configured to perceptually map input code values in a VDR input image into a specific optimal dynamic range window determined based on the VDR input image. Pixel adjustments generated or determined by the display management module (604) can be used to control pixel-level or pixel-block-level light modulation components (612) to render on a display screen (606) a perceptually correct LDR image corresponding to the VDR input image. In one embodiment, the display management module may continuously update its input min/max values as a function of the iris state. In one embodiment, this global modulation driver module can theoretically be combined with the display management module. For example, at the current state, the display management module expects a display min/max value and then maps accordingly. Similarly, the pixel adjustment block creates the accurate drive values for the DLP/LCD—e.g., in a feedback loop.

To avoid "pumping" artifacts (e.g., unintended oscillations or sudden shifts of absolute minimum and maximum luminance levels in consecutive dynamic range windows, etc.), temporal dampening can be applied so that two different dynamic range windows can transition into each other relatively gradually, for example, in a time interval 0.5 second, 1 second, 3 seconds, etc., rather than suddenly, perceptually speaking.

The display system is configured to determine/select a dynamic range window for a VDR input image and to identify/determine an input code value range for perceptual preservation in the dynamic range window. For example, the display system can determine a luminance level distribution of the VDR input image, select the dynamic range window to cover as much in the luminance level distribution as possible, and determine, based on the display system's global light modulation capability, a particular setting of global light modulation to produce the dynamic range window. Luminance levels in the luminance level distribution may be weighted differently. Luminance levels that have relatively large numbers of pixels are assigned relatively high weights in relation to other luminance levels that have relatively small numbers of pixels. The display system may be biased to select the dynamic range window to cover more luminance levels that have relatively numerous pixels. Further, the display system can use the luminance level distribution to identify the input code value range for perceptual preservation in the dynamic range window.

The display system may be configured to minimize the number of "out-of-range" pixels outside the input code value range for perceptual preservation and/or minimize the number of levels that need luminance compression. The display system may be configured to minimize the number of luminance levels that needed luminance compression (e.g., through tone-mapping, display management operations including but not limited to those developed by Dolby Laboratories, Inc., San Francisco, Calif., etc.).

The display system can perceptually and accurately adjust the input code values of in-range pixels to output code values, and map the input code values of out-of-range pixels to output code values with compressed luminance levels through tone-mapping, etc.

Operations to select optimal dynamic range windows to cover at least salient portions of VDR input images and operations to set settings of global light modulation are correlated. A feedback loop may be implemented between the display management module (604) and the global modulation driver (602) to continuously select dynamic range windows and set settings of global light modulation. As a result, perceptually correct images can be maintained even when the overall luminance levels of VDR input images change over time.

VDR luminance levels of in-range pixels of a VDR input image can be perceptually maintained by LDR luminance levels in one or more portions of a dynamic range window reserved for perceptual preservation. Depending on the dynamic ranges of the VDR input images as received by the display system, it is possible that certain VDR luminance levels of the VDR input image still lie outside of the selected dynamic range window and thus still end up clipped or compressed. The clipping and compression of some VDR luminance levels can be perceptually hidden by mapping those VDR luminance levels into LDR luminance levels in some portions of the dynamic range window reserved for display management. At any given time, zero or more portions of a dynamic range window reserved for display management and one or more portions of the dynamic range window reserved for perceptual preservation constitute the entire dynamic range window.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A projector display system, said display system comprising:
    a light source, the light source further comprising a set of colored laser light sources;
    for each color, a light conduit providing a light path for the corresponding colored light from said set of colored laser light source;
    for each light conduit, an adjustable iris comprising a light dimmer and configured to adjust the luminance of its associated colored laser light; and
    a light combiner, said light combiner configured to combine each said colored laser light passing through each associated adjustable iris;
    a controller;
    said light dimmer being illuminated by said light source and said light dimmer being controller by the controller to dim the amount of light from the light source;
    a first modulator, said first modulator being illuminated by light from said light dimmer and configured to modulate light from said light dimmer under control from the controller;
    said controller further comprising:
    a processor;
    a memory, said memory associated with said processor and said memory further comprising processor-readable instructions, such that when said processor reads the processor-readable instructions, causes the processor to perform the following instructions:
    receiving image data, said image data comprising Enhanced Dynamic Range (EDR) image data;
    sending control signals to said light dimmer such that said light dimmer may allocate a desired proportion of the light from said light source onto said first modulator; and
    sending control signals to said first modulator such that said desired proportion of the light from said light source is modulated to form the desired screen image.

2. The display system of claim 1 wherein said light source comprises one of a group, said group comprising: a xenon lamp, an arc lamp, a laser, an array of lasers, an array of solid-state light emitters.

3. The display system of claim 2 wherein said light source comprises an array of lasers wherein said lasers may be modulated globally and locally.

4. The display system of claim 1 wherein said light source comprises an adjustable light source.

5. The display system of claim 4 wherein said first modulator comprises one of a group, said group comprising: MEMS array, DMD array, a set of controllable analog mirrors and a set of controllable digital mirrors.

6. The display system of claim 1 wherein the system further comprises an integrating rod, said integrating rod accepting light combined from the set of colored light sources and transmits light to said first modulator.

7. The display system of claim 6 wherein the system further comprises an LCD stack placed in front of the integrating rod, said LCD capable of modulating light entering into the integrating rod.

8. The display system of claim 7 wherein the integrating rod is segmented and each segment of the integrating rod further comprises an associated LCD stack.

* * * * *

UNITED STATES PATENT AND TRADEMARK OFFICE
CERTIFICATE OF CORRECTION

PATENT NO. : 9,462,215 B2
APPLICATION NO. : 14/530977
DATED : October 4, 2016
INVENTOR(S) : Gorny et al.

It is certified that error appears in the above-identified patent and that said Letters Patent is hereby corrected as shown below:

On the Title Page

Column 1, Line 11 (73) Assignee: please delete "Dobly Laboratories Licensing Corporation" and insert therefor -- Dolby Laboratories Licensing Corporation --

Signed and Sealed this
Twenty-seventh Day of November, 2018

Andrei Iancu
*Director of the United States Patent and Trademark Office*